United States Patent
Bonnet

(10) Patent No.: US 7,959,412 B2
(45) Date of Patent: Jun. 14, 2011

(54) WIND TURBINE ROTOR BLADE WITH ACOUSTIC LINING

(75) Inventor: Laurent Bonnet, Mesum (DE)

(73) Assignee: General Electric Company, Schenectady, NY (US)

(*) Notice: Subject to any disclaimer, the term of this patent is extended or adjusted under 35 U.S.C. 154(b) by 561 days.

(21) Appl. No.: 11/536,963

(22) Filed: Sep. 29, 2006

(65) Prior Publication Data

US 2008/0080977 A1 Apr. 3, 2008

(51) Int. Cl.
*F01D 5/14* (2006.01)

(52) U.S. Cl. .............................. 416/231 R; 416/229 R

(58) Field of Classification Search .............. 416/146 R, 416/229 R, 231 R, 236 R
See application file for complete search history.

(56) References Cited

U.S. PATENT DOCUMENTS

| | | | |
|---|---|---|---|
| 3,791,483 A * | 2/1974 | Vasiljevic | 181/252 |
| 3,820,628 A * | 6/1974 | Hanson | 181/214 |
| 4,298,090 A * | 11/1981 | Chapman | 181/286 |
| 4,935,277 A * | 6/1990 | Le Balc'h | 428/71 |
| 5,041,323 A * | 8/1991 | Rose et al. | 428/116 |
| 5,782,082 A | 7/1998 | Hogeboom et al. | |
| 5,841,079 A | 11/1998 | Parente | |
| 6,360,844 B2 | 3/2002 | Hogeboom et al. | |
| 6,382,921 B1 * | 5/2002 | Selig et al. | 416/243 |
| 7,018,172 B2 * | 3/2006 | Prasad et al. | 415/119 |
| 7,337,875 B2 * | 3/2008 | Proscia et al. | 181/214 |
| 2004/0129493 A1 * | 7/2004 | Campbell | 181/204 |
| 2005/0135924 A1 * | 6/2005 | Prasad et al. | 415/115 |

FOREIGN PATENT DOCUMENTS

DE 3643481 A * 11/1987

* cited by examiner

*Primary Examiner* — Edward Look
*Assistant Examiner* — Ryan H Ellis
(74) *Attorney, Agent, or Firm* — Global Patent Operation; Douglas D. Zhang

(57) ABSTRACT

A rotor blade for a wind turbine is provided, the rotor blade comprising an acoustically porous surface layer at least partially covering at least one surface of the rotor blade, at least one reactive acoustic element located below said acoustically porous surface layer, and a resistive acoustic layer located between said acoustically porous surface layer and said at least one reactive acoustic element.

4 Claims, 6 Drawing Sheets

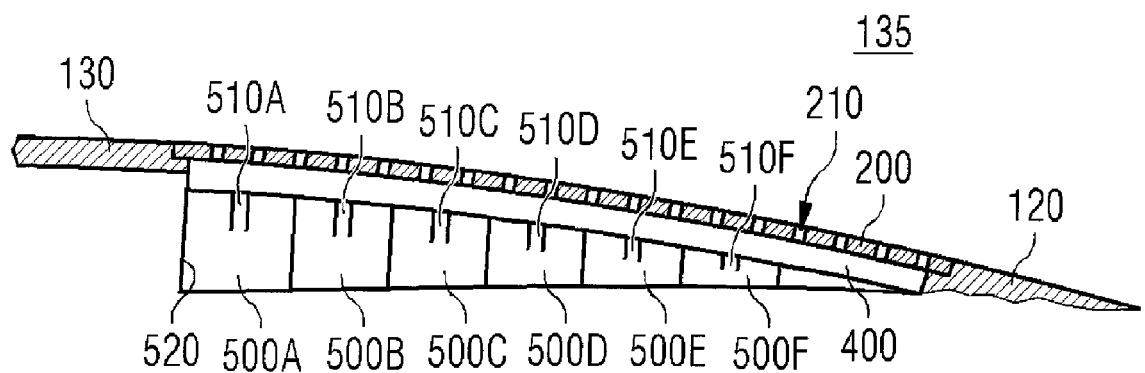
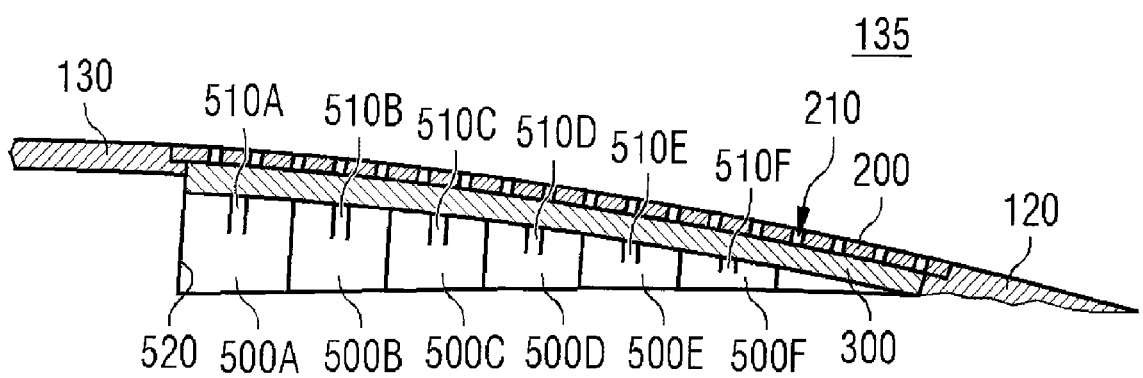
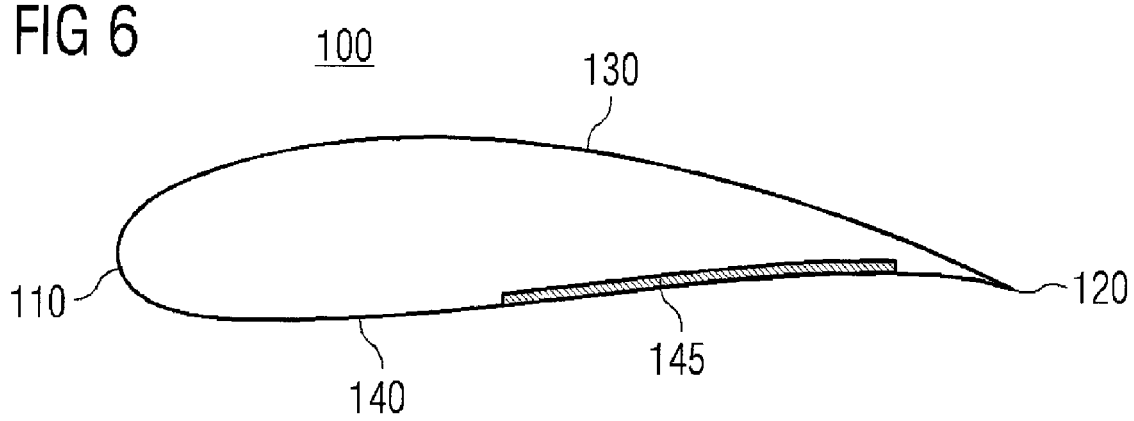

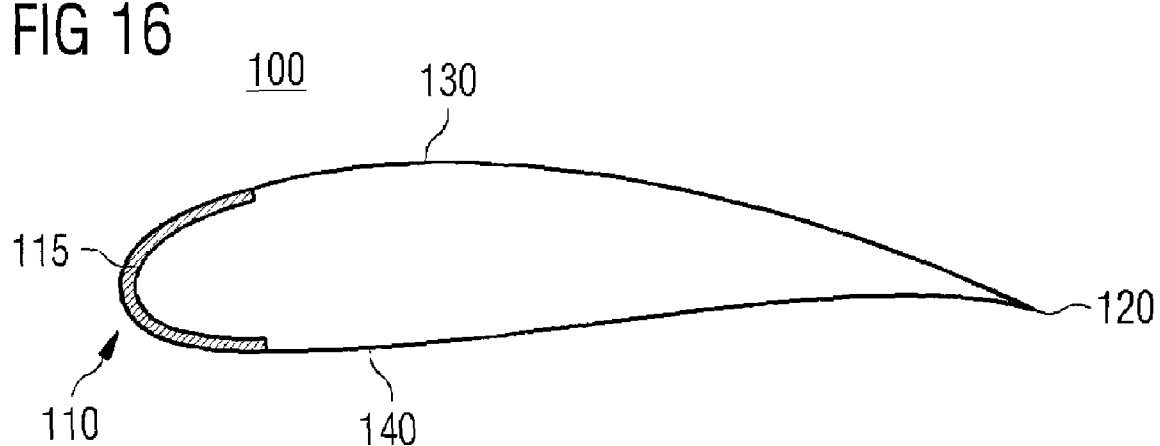
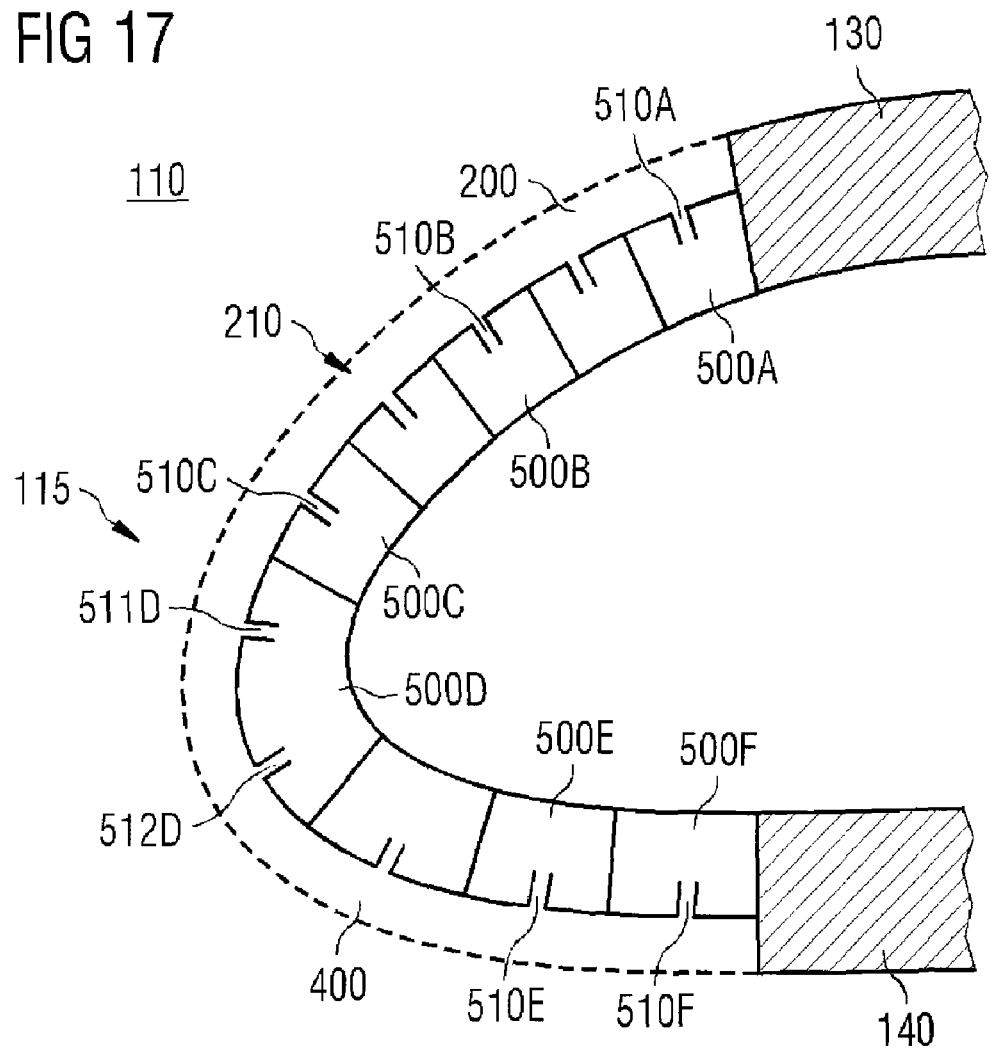

WIND TURBINE ROTOR BLADE WITH ACOUSTIC LINING

BACKGROUND OF THE INVENTION

The present invention relates generally to wind turbine rotor blades and in particular to wind turbine rotor blades having an acoustic lining. In particular, the present invention relates to an acoustic lining of a wind turbine rotor blade for reducing the noise emission from the wind turbine.

Noise emission from technical installations, particularly power systems, is a safety and environmental concern. Legislation dictates the admissible sound pressure level that a noise source in a certain location may continuously make so that reduced noise emission is a key requirement for low impact environmental integration. Regulations governing these levels vary currently from country to country. Typically, the maximum allowable noise values depend on the character of the surroundings and the time of day. For example, 55 dB(A) may be allowed in a prevailing industrial surrounding during the day, whereas only 35 dB(A) may be allowed in exclusively residential surroundings during the night. These regulations define environmental requirements and acoustical targets for wind turbine installations.

In view of the above, noise generated by wind turbines is an important issue in wind turbine design. The noise generated by the wind turbine is partly mechanical and partly aerodynamic. Mechanical noise is generated mainly from machinery in the nacelle, particularly the gearbox and the generator, although there may also be contributions from cooling fans, auxiliary equipment (such as pumps and compressors), bearings and the yaw system. A major cause for aerodynamic noise of a wind turbine is the operation of the rotor blades. In particular, several mechanisms for generating aerodynamic noise at the blade are known: blade airfoil thickness and in-flow turbulence noise, laminar layer oscillation noise, blade flow separation oscillation noise, and turbulent boundary layer edge interaction noise.

BRIEF DESCRIPTION OF THE INVENTION

In view of the above, a rotor blade for a wind turbine is provided. The rotor blade includes an acoustically porous surface layer at least partially covering at least one surface of the rotor blade, at least one reactive acoustic element located below said acoustically porous surface layer, and a resistive acoustic layer located between said acoustically porous surface layer and said at least one reactive acoustic element.

Further aspects, advantages and features of the present invention are apparent from the dependent claims, the description and the accompanying drawings.

According to a first aspect of the invention, an airfoil for a wind turbine is provided. The airfoil surface includes an acoustically partially transparent region which covers at least a part of the high pressure side or the low pressure side or both. A resonator is located inside the airfoil beneath the acoustically transparent surface region. Furthermore, an acoustic damping layer is sandwiched between the acoustically transparent surface region and the resonator.

Embodiments according to the first aspect of the invention realize broadband noise reduction by means of dissipative and reactive elements either alone or in combination with one another. Thus, the present invention provides a passive fail safe noise reduction system which can also be retrofitted to existing turbines.

According to a further aspect of the present invention, a rotor blade for a wind turbine is provided, wherein the rotor blade includes an acoustically porous surface layer at least partially covering at least one surface of the rotor blade, and a resistive acoustic layer located below said acoustically porous surface layer.

During operation of the wind turbine, aerodynamic noise in the audible frequency range of 20 Hz to 20,000 Hz is typically dominated by low and medium frequencies in the range from 200 Hz to 2,000 Hz which can permeate the acoustically porous surface layer and will be absorbed by the resistive acoustic layer. Thus, the acoustic waves become dissipated within the resistive acoustic layer and the noise emission from the turbine rotor blades is considerably reduced.

According to another aspect of the present invention, a rotor blade for a wind turbine is provided, wherein an acoustically porous surface layer at least partially covers at least one surface of the rotor blade, at least one reactive acoustic element is located below said acoustically porous surface layer, and an air layer located between said acoustically porous surface layer and said at least one reactive acoustic element.

During operation of the wind turbine, the reactive elements are activated by the sound pressure transmitted through the acoustically porous surface layer. The reactive elements serve as reactive acoustic members for dissipating acoustic energy. Thus, the noise emission from the turbine rotor blades is considerably reduced.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures wherein:

FIG. 4 shows an enlarged cross-sectional view of a wind turbine rotor blade according to another embodiment of the present invention.

FIG. 5 shows an enlarged cross-sectional view of a wind turbine rotor blade according to a further embodiment of the present invention.

FIG. 6 shows a cross-sectional view of a wind turbine rotor blade according to another embodiment of the present invention.

FIG. 16 shows a cross-sectional view of a wind turbine rotor blade according to a further embodiment of the present invention.

FIG. 17 shows an enlarged cross-sectional view of the leading edge portion of the wind turbine rotor blade shown in FIG. 16.

DETAILED DESCRIPTION OF THE INVENTION

Reference will now be made in detail to the various embodiments of the invention, one or more examples of which are illustrated in the figures. Each example is provided by way of explanation of the invention, and is not meant as a limitation of the invention. For example, features illustrated or described as part of one embodiment can be used on or in conjunction with other embodiments to yield yet a further embodiment. It is intended that the present invention includes such modifications and variations.

Figure 1:
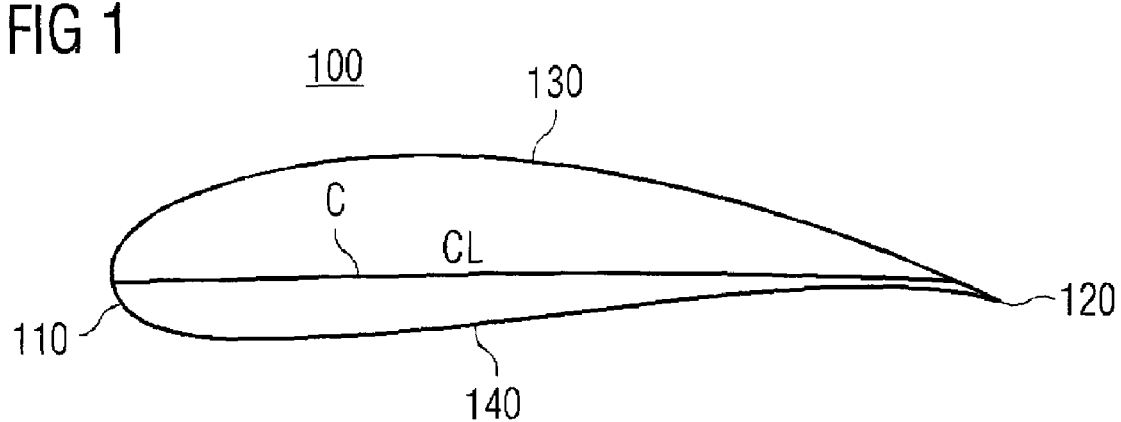
FIG. 1 shows a cross-sectional view of a wind turbine rotor blade.

FIG. 1 shows a cross-sectional view of a wind turbine rotor blade 100 perpendicular to the longitudinal blade axis. Thus, the profile or airfoil of the rotor blade is apparent from FIG. 1. The rotor blade 100 includes a leading edge 110 and a trailing edge 120 which are connected to each other by a suction side 130 and a pressure side 140. Furthermore, the chord C of the profile has a chord length CL.

Figure 2:
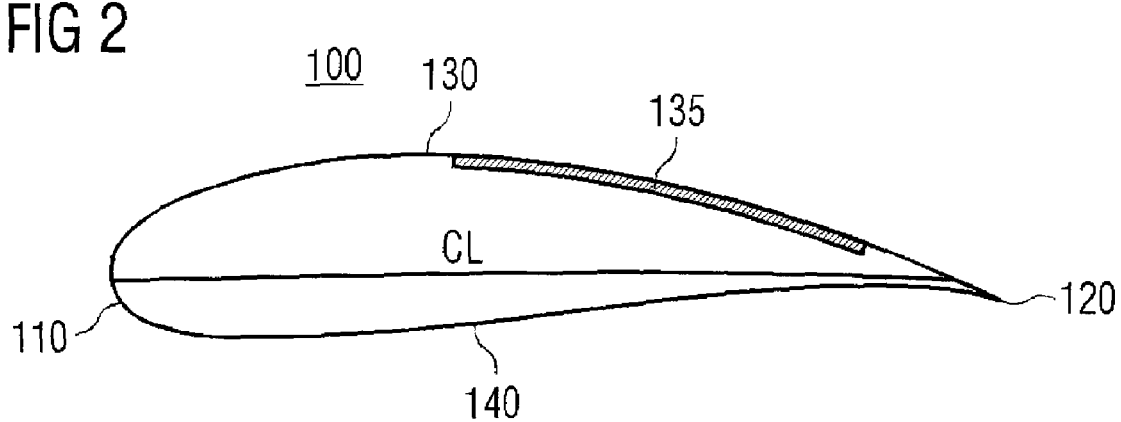
FIG. 2 shows a cross-sectional view of a wind turbine rotor blade according to an embodiment of the present invention.

FIG. 2 shows a cross-sectional view of a wind turbine rotor blade according to an embodiment of the present invention. Therein, an acoustically effective portion 135 at the suction side 130 of the rotor blade 100 is shown. Although not being limited to the size and location of acoustically effective portion 135, FIG. 2 shows a typical embodiment in that the acoustically effective portion 135 is located adjacent the trailing edge 120 and extends across the suction side 130 about 25% to about 75% of the chord length CL.

Figure 3:
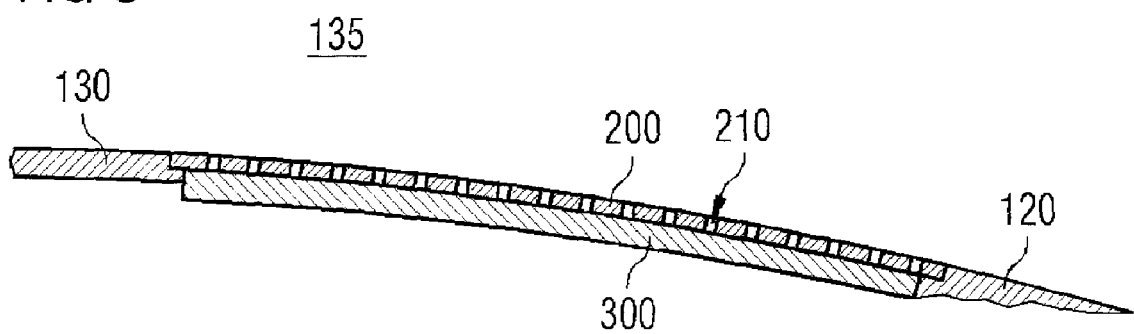
FIG. 3 shows an enlarged cross-sectional view of a wind turbine rotor blade according to an embodiment of the present invention.

FIG. 3 shows an enlarged cross-sectional view of a wind turbine rotor blade according to an embodiment of the present invention. Therein, the acoustically effective portion 135 of the rotor blade 100 is shown. The acoustically effective portion 135 includes an acoustically porous surface layer 200 and a resistive acoustic layer 300 located below the acoustically porous layer 200, i.e. inside the blade profile.

In this context, it should be understood that the term "acoustically porous layer" relates to the acoustical properties of the surface layer only. The term "acoustically porous layer" means that the layer is at least partially permeable to sound within a predetermined frequency range. In other words, the layer is not soundproof for sound in the predetermined frequency range. However, a material may be acoustically porous within one frequency range, e.g. low frequencies, whereas the same material may be impermeable for sound within a different frequency range, e.g. high frequencies. Furthermore, it should be understood that the term "acoustically porous" is not necessarily linked to the mechanical porosity of the surface layer. In particular, mechanically porous layers may be soundproof for sound within a specific frequency range whereas mechanically non-porous material may well be permeable for sound within a specific frequency range. Furthermore, it should be understood that the term "acoustically porous" includes also acoustically transparent surface layers, i.e. surface layers having almost no damping for sound within the predetermined frequency range. On the other hand, also surface layers having typically 0 to 10 dB acoustic damping may still be regarded as "acoustically porous layers" as long as they provide sufficient sound transmission for the purpose of the present invention.

In one embodiment, the acoustically porous layer 200 is formed as a perforated metal sheet. In another embodiment, the acoustically porous layer 200 is formed by perforating the fiber-reinforced plastic shell of the rotor blade. In both embodiments, holes 210 are provided in the surface layer 200. Typically, the total area of the holes 210 covers from 1% to 20% of the area of acoustically effective portion 135. It should be understood that surface layer 200 is almost acoustically transparent if the total area of the holes is in the range from about 15% to about 20% of the area of acoustically effective portion 135. However, also a small degree of perforation in the range from 1% to 5% may be selected so that the permeability of the surface layer 200 to water and/or ice is limited. According to another embodiment, the acoustically porous layer 200 can be formed as a plastic membrane without holes. For example, the plastic membrane may be an acoustically transparent film of a few microns thickness. Typically, such a film is waterproof so that the rain and/or ice cannot enter the interior of the rotor blade.

The resistive acoustic layer 300 is located below acoustically porous surface layer 200, i.e. inside rotor blade 100. Resistive acoustic layer 300 is formed as an acoustic absorber layer 300 adapted to the frequency range to which surface layer 200 is acoustically porous. Typically, acoustic absorber layer 300 is absorptive for medium frequencies, for example frequencies within a range from 200 Hz to 2,000 Hz. Typically, acoustic absorber 200 is formed by a layer of poroelastic material such as porous cell foam material (polyurethane foam, polyether foam, melamine foam, etc.), porous natural fiber material agglomerate (wood fiber, coconut fiber, etc.) and/or single or multi-layer cloth material (cotton, linen, hemp, etc.). However, those skilled in the art are aware of other types of acoustic absorbers absorptive in a medium frequency range. In one embodiment, acoustic absorber 300 is waterproof. Thus, acoustic absorber 300 prevents rain and/or ice from entering the interior of rotor blade 100. Typically, such a waterproof acoustic absorber 300 may be used together with a perforated surface layer 200.

During operation of the wind turbine, aerodynamic noise in the audible frequency range from 20 Hz to 20,000 Hz is typically dominated by low and medium frequencies in the range from 200 Hz to 2,000 Hz which will permeate the acoustically porous surface layer 200 and will be absorbed by acoustic absorber layer 300. Thus, the acoustic waves become dissipated within absorber layer 300 and the noise emission from the turbine rotor blades is considerably reduced. Accordingly, the absorber layer 200 may be regarded as a dissipative acoustic member.

FIG. 4 shows an enlarged cross-sectional view of a wind turbine rotor blade according to another embodiment of the present invention. Therein, the suction side 130 of the rotor blade includes an acoustically porous surface layer 200. The properties and configuration of acoustically porous surface layer 200 are as described above with reference to FIG. 3. However, instead of acoustic absorber 300 an air layer 400 is provided below acoustically porous surface layer 200. Beneath air layer 400, at least one reactive acoustic element 500A is provided.

In this context, the reactive acoustic element is typically formed as a capillary resonator, a foil resonator, a plate resonator, a perforated plate resonator or a Helmholtz resonator. A capillary resonator includes a series of tubular or laminar capillaries enclosed by one or more partition walls. Either one or both ends of the tube or capillary may be open. In other words, a capillary resonator is formed by a network of tubes or a network of plates. Also, honeycomb blocks may be used as capillary resonators. A foil or plate resonator includes a pretensioned or clamped or freely suspended foil or plate on a specifically shaped perimeter edge resonating at foil or plate natural frequencies. A perforated plate resonator includes a perforated plate with a specific perforation pattern, e.g. circular holes or slots) arranged over an air layer of constant or varying thickness. A Helmholtz resonator includes an enclosed resonating volume with a single or multiple flat or ducted apertures. In the drawings and the following description, reference is made to Helmholtz resonators as reactive acoustic elements. However, it will be understood by those skilled in the art that this is only to exemplify the principles underlying the present invention but should not be construed as limiting the reactive acoustic element to Helmholtz resonators. Rather, any of the above described resonator types as well as other applicable resonator types known in the art may be used to practice the present invention.

As described above, a Helmholtz resonator is used as a reactive acoustic element in the embodiment shown in FIG. 4. Helmholtz resonator 500A has a box-like resonating volume which is coupled to air layer 400 via a resonator opening 510A. Typically, the resonator opening 510A is formed as a little tube. It is known in the art that the resonance frequency of the Helmholtz resonator is determined by the resonating volume, the length of the opening 510A and the area of the opening 510A. Thus, the resonance frequency of Helmholtz resonator 500A can be tuned by adjusting its resonating volume, the length of its opening 510A and the area of its opening 510A. Typically, Helmholtz resonator 500A is tuned to a low frequency, i.e. to a frequency in the range from 20 Hz to 200 Hz.

In the embodiment shown in FIG. 4 a series of Helmholtz resonators 500A-500F is provided underneath the acoustically porous surface layer 200. Typically, the resonating volumes and/or the length of the openings 510A-510F and/or the areas of the openings 510A-510F may be different so that each of the Helmholtz resonators 500A-500F can have a different resonance frequency. Thus, a whole spectrum of frequencies can be covered by the series of Helmholtz resonators 500A-500F. Although a series of Helmholtz resonators 500A-500F is shown in FIG. 4, it should be understood that the principle underlying the present invention can be realized also with only a single Helmholtz resonator 500A.

During operation of the wind turbine, Helmholtz resonators 500A-500F are activated by the sound pressure transmitted through acoustically porous surface layer 200. The Helmholtz resonators serve as reactive acoustic members for dissipating acoustic energy. Optionally, this effect can be further enhanced by providing a Helmholtz resonator with an absorptive lining 520 on the inner walls of the resonating volume.

FIG. 5 shows an enlarged cross-sectional view of a wind turbine rotor blade according to a further embodiment of the present invention. This embodiment is similar to the embodiment shown in FIG. 4. However, the air layer 400 is replaced by an acoustic absorber layer 300 sandwiched between the acoustically porous surface layer 200 and the Helmholtz resonators 500A-500F. Acoustic absorber 300 is adapted for absorbing sound in the mid-to-high frequency range, i.e. frequencies in the range from about 200 Hz to about 2,000 Hz. However, Acoustic absorber 300 is acoustically porous to low frequencies, i.e. frequencies in the range from about 20 Hz to about 200 Hz. Thus, the Helmholtz resonators 500A-500F, which are reactive to the low frequency range, are acoustically coupled to the exterior of the rotor blade. Thus, the embodiment shown in FIG. 5 combines dissipative and reactive acoustic elements to reduce the sound produced by the rotor blades of the wind turbine. Furthermore, the embodiment shown in FIG. 5 is effective within a wide frequency range including frequencies as low as, e.g., 20 Hz up to frequencies as high as, e.g., 2,000 Hz. Thus, broadband noise reduction is realized.

FIG. 6 shows a cross-sectional view of a wind turbine rotor blade according to another embodiment of the present invention. Therein, an acoustically effective portion 145 at the pressure side 140 of the rotor blade 100 is shown. Although not being limited to the size and location of acoustically effective portion 145, FIG. 6 shows a typical embodiment in that the acoustically effective portion 145 is located adjacent the trailing edge 120 and extends across the pressure side about 25% to about 75% of the chord length CL.

Figure 7:
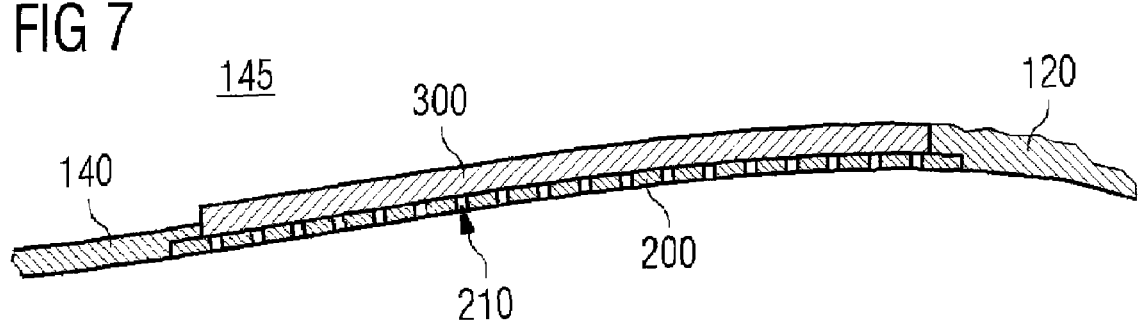
FIG. 7 shows an enlarged cross-sectional view of a wind turbine rotor blade according to an embodiment of the present invention.

FIG. 7 shows an enlarged cross-sectional view of a wind turbine rotor blade according to an embodiment of the present invention. In one embodiment, the acoustically porous layer 200 is formed as a perforated metal sheet. In another embodiment, the acoustically porous layer 200 is formed by perforating the fiber-reinforced plastic shell of the rotor blade. In both embodiments, holes 210 are provided in the surface layer 200. Typically, the total area of the holes 210 covers from 1% to 20% of the area of acoustically effective portion 145. It should be understood that surface layer 200 is almost acoustically transparent if the total area of the holes is in the range from about 15% to about 20% of the area of acoustically effective portion 145. However, also a small degree of perforation in the range from 1% to 5% may be selected so that the permeability of the surface layer 200 to water and/or ice is limited. According to another embodiment, the acoustically porous layer 200 can be formed as a plastic membrane without holes. For example, the plastic membrane may be an acoustically transparent film of a few microns thickness. Typically, such a film is waterproof so that the rain and/or ice cannot enter the interior of the rotor blade.

The acoustic absorber 300 is located below acoustically porous surface layer 200, i.e. inside rotor blade 100. Acoustic absorber 300 is adapted to the frequency range to which surface layer 200 is acoustically porous. Typically, acoustic absorber layer 300 is absorptive for medium frequencies, for example frequencies within a range from 200 Hz to 2,000 Hz. Typically, acoustic absorber 200 is formed by a layer of poroelastic material such as porous cell foam material (polyurethane foam, polyether foam, melamine foam, etc.), porous natural fiber material agglomerate (wood fiber, coconut fiber, etc.) and/or single or multi-layer cloth material (cotton, linen, hemp, etc.). However, those skilled in the art are aware of other types of acoustic absorbers absorptive in a medium frequency range. In one embodiment, acoustic absorber 300 is waterproof. Thus, acoustic absorber 300 prevents rain and/or ice from entering the interior of rotor blade 100. Typically, such a waterproof acoustic absorber 300 may be used together with a perforated surface layer 200.

During operation of the wind turbine, noise in the mid-to-high frequency range, e.g. in the range from 200 Hz to 2,000 Hz will permeate the acoustically porous surface layer 200 and will be absorbed by acoustic absorber layer 300. Thus, the acoustic waves become dissipated within absorber layer 300 and the noise emission from the turbine rotor blades is considerably reduced.

Figure 8:
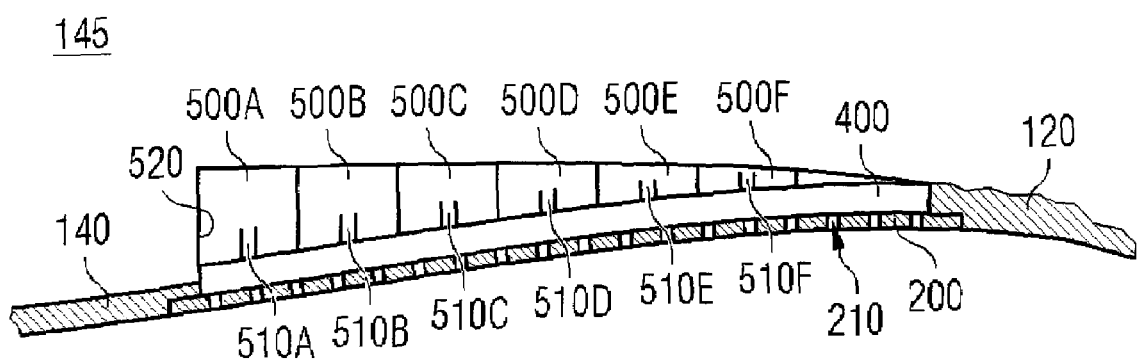
FIG. 8 shows an enlarged cross-sectional view of a wind turbine rotor blade according to another embodiment of the present invention.

FIG. 8 shows an enlarged cross-sectional view of a wind turbine rotor blade according to another embodiment of the present invention. Therein, the pressure side 140 of the rotor blade includes an acoustically porous surface layer 200. The properties and configuration of acoustically porous surface layer 200 are as described above with reference to FIG. 7. However, instead of acoustic absorber 300 an air layer 400 is provided above acoustically porous surface layer 200, i.e. inside the rotor blade. Above air layer 400, at least one Helmholtz resonator 500A is provided. Typically, Helmholtz resonator 500A has a box-like resonating volume which is coupled to air layer 400 via a resonator opening 510A. Typically, the resonator opening 510A is formed as a little tube. It is known in the art that the resonance frequency of the Helmholtz resonator is determined by the resonating volume, the length of the opening 510A and the area of the opening 510A. Thus, the resonance frequency of Helmholtz resonator 500A can be tuned by adjusting its resonating volume, the length of its opening 510A and the area of its opening 510A. Typically, Helmholtz resonator 500A is tuned to a low frequency, i.e. to a frequency in the range from 20 Hz to 200 Hz.

In the embodiment shown in FIG. 8 a series of Helmholtz resonators 500A-500F is provided above the acoustically porous surface layer 200. Typically, the resonating volumes and/or the length of the openings 510A-510F and/or the areas of the openings 510A-510F may be different so that each of the Helmholtz resonators 500A-500F can have a different resonance frequency. Thus, a whole spectrum of frequencies can be covered by the series of Helmholtz resonators 500A-500F. Although a series of Helmholtz resonators 500A-500F is shown in FIG. 8, it should be understood that the principle underlying the present invention can be realized also with only a single Helmholtz resonator 500A.

During operation of the wind turbine, Helmholtz resonators 500A-500F are activated by the sound pressure transmitted through acoustically porous surface layer 200. The Helmholtz resonators serve as reactive acoustic members for dissipating acoustic energy. Optionally, this effect can be further enhanced by providing a Helmholtz resonator with an absorptive lining 520 on the inner walls of the resonating volume.

Figure 9:
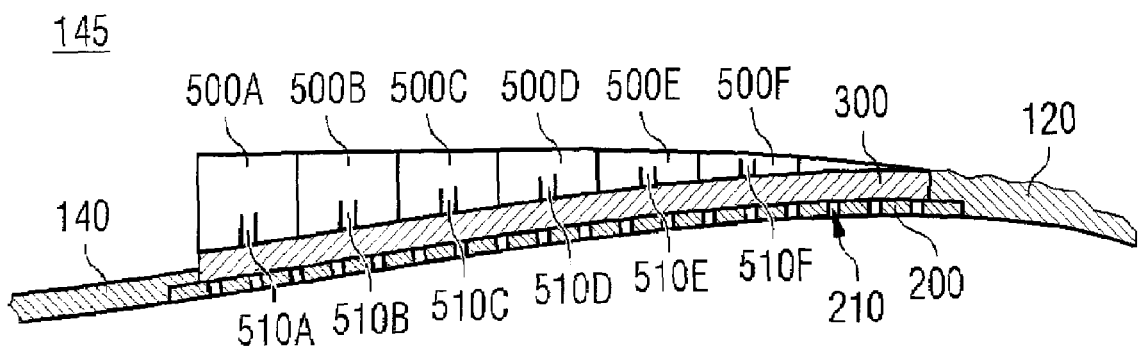
FIG. 9 shows an enlarged cross-sectional view of a wind turbine rotor blade according to a further embodiment of the present invention.
Figure 10:
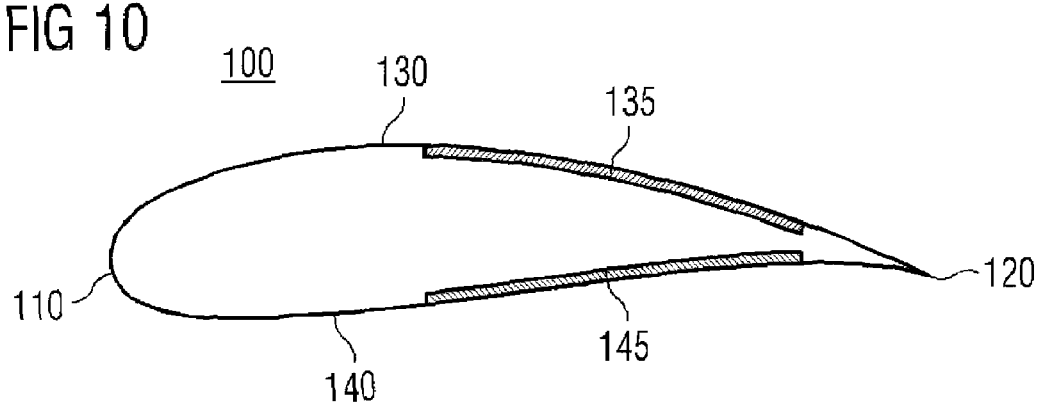
FIG. 10 shows a cross-sectional view of a wind turbine rotor blade according to another embodiment of the present invention.

FIG. 9 shows an enlarged cross-sectional view of a wind turbine rotor blade according to a further embodiment of the present invention. This embodiment is similar to the embodiment shown in FIG. 8. However, the air layer 400 is replaced by an acoustic absorber layer 300 sandwiched between the acoustically porous surface layer 200 and the Helmholtz resonators 500A-500F. Acoustic absorber 300 is adapted for absorbing sound in the mid-to-high frequency range, i.e. frequencies in the range from about 200 Hz to about 2,000 Hz. However, Acoustic absorber 300 is acoustically porous to low frequencies, i.e. frequencies in the range from about 20 Hz to about 200 Hz. Thus, the Helmholtz resonators 500A-500F, which are reactive to the low frequency range, are acoustically coupled to the exterior of the rotor blade. Thus, the embodiment shown in FIG. 9 combines dissipative and reactive acoustic elements to reduce the sound produced by the rotor blades of the wind turbine. Furthermore, the embodiment shown in FIG. 9 is effective within a wide frequency range including frequencies as low as, e.g., 20 Hz up to frequencies as high as, e.g., 2,000 Hz. Thus, broadband noise reduction is realized.

Figure 11:
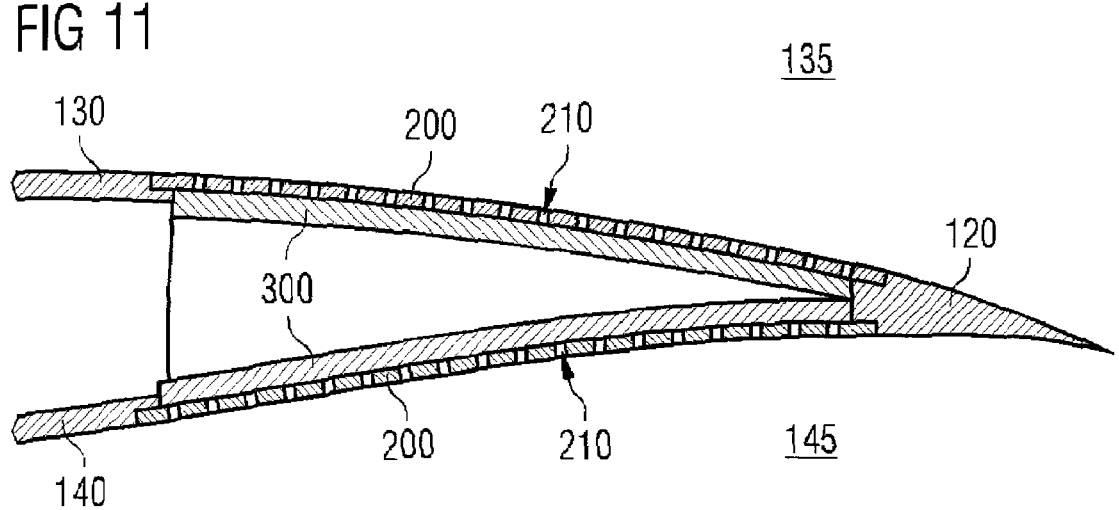
FIG. 11 shows an enlarged cross-sectional view of a wind turbine rotor blade according to an embodiment of the present invention.
Figure 12:
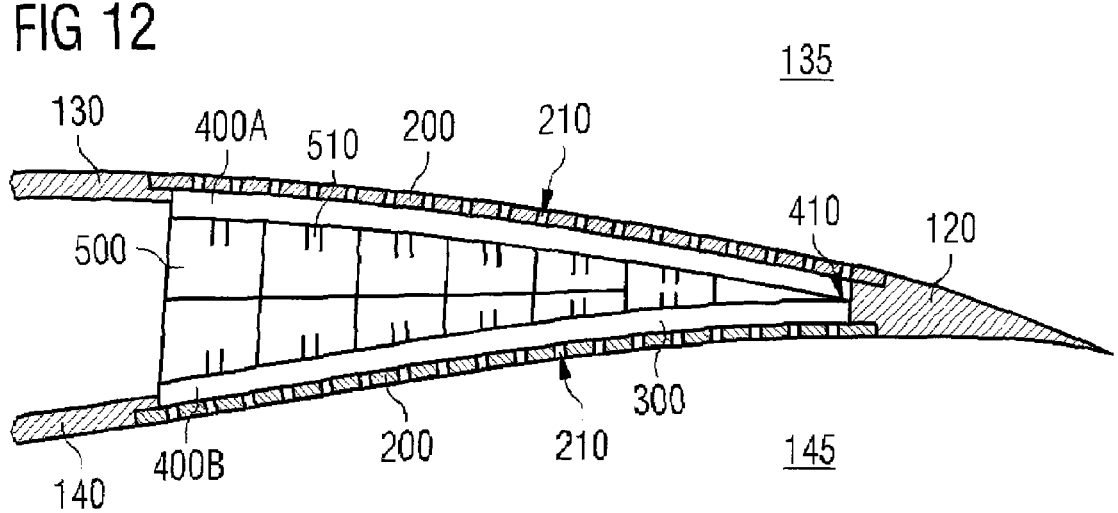
FIG. 12 shows an enlarged cross-sectional view of a wind turbine rotor blade according to another embodiment of the present invention.
Figure 13:
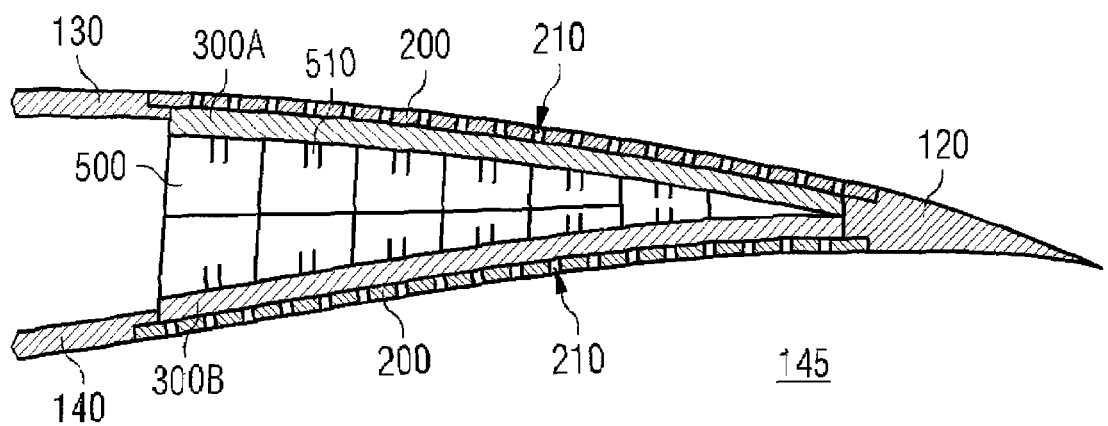
FIG. 13 shows an enlarged cross-sectional view of a wind turbine rotor blade according to a further embodiment of the present invention.

FIGS. 10 to 13 show further embodiments of the present invention. In principle, the embodiments shown in FIGS. 10 to 13 are combinations of the embodiments described above. In particular, the embodiment shown in FIG. 11 is a combination of the embodiments shown in FIGS. 3 and 7, the embodiment shown in FIG. 12 is a combination of the embodiments shown in FIGS. 4 and 8, and the embodiment shown in FIG. 13 is a combination of the embodiments shown in FIGS. 5 and 9. Accordingly, the dissipative elements 300 and reactive elements 500A-500F may be provided both at the suction side 130 and/or the pressure side. Furthermore, it should be understood that each of the suction side embodiments shown in FIGS. 3 to 5 may be combined with any of the pressure side embodiments shown in FIGS. 7 to 9. In FIG. 12, air layer 400A at the suction side and air layer 400B at the pressure side may be either separated from or coupled to each other at a portion 410 near the trailing edge.

Figure 14:
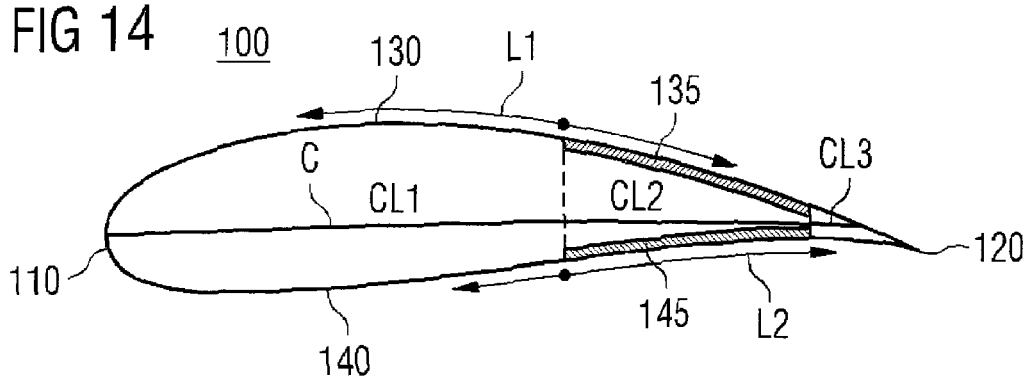
FIG. 14 shows a cross-sectional view of a wind turbine rotor blade according to a further embodiment of the present invention.

FIG. 14 shows a cross-sectional view of a wind turbine rotor blade according to a further embodiment of the present invention. Therein, it is shown that the chord length CL of the blade chord C can be divided into a first chord length CL1 extending from the leading edge 110 to the acoustically effective portions 135, 145, a second chord length CL2 extending across the acoustically effective portions 135, 145, and a third chord length CL3 extending from the end of the acoustically effective portions 135, 145 to the trailing edge 120. Furthermore, it is shown that the acoustically effective portion 135 at the suction side 130 has a chord-wise extension L1 and the acoustically effective portion 145 at the pressure side 140 has a chord-wise extension L2. In the embodiment shown in FIG. 14, the chord-wise extensions L1 and L2 are equal. However, this is not necessarily so. Rather, chord-wise extensions L1 and L2 may be different as indicated by the arrows at the suction and pressure sides 130, 140 of the blade. Typically, the chord-wise extensions L1, L2 of the acoustically effective portions 135, 145 extend about 25% to 75% chord length, i.e. $0.25\ CL \leq L1\ (L2) \leq 0.75\ CL$, with $CL = CL1 + CL2 + CL3$. Typically, the acoustically effective portions 135, 145 are located at or near the trailing edge 120 so that they can reduce the turbulent boundary layer trailing edge noise.

Figure 15:
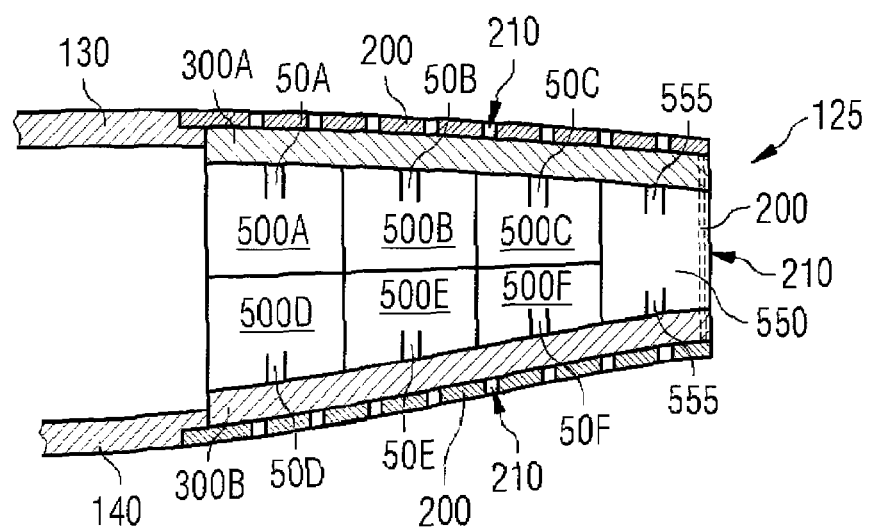
FIG. 15 shows a cross-sectional view of a wind turbine rotor blade with a blunt trailing edge according to another embodiment of the present invention.

FIG. 15 shows a cross-sectional view of a wind turbine rotor blade with a blunt trailing edge according to another embodiment of the present invention. In this embodiment, the blade profile has a blunt trailing edge 125 as it is typically provided near the blade root. The blunt trailing edge face of the profile is provided with an acoustically porous surface layer 200 of the type described above. Furthermore, a blunt edge resonator 550 is provided inside the rotor blade. Blunt edge resonator 550 is of the Helmholtz type and includes at least one resonator opening 555 but may have also one opening toward the suction side 130 and one opening toward the pressure side 140. Additionally or alternatively, blunt edge resonator 550 may also have a resonator opening oriented toward the blunt trailing edge face 125. Thus, resonator 550 can be coupled to the air flow behind the blunt trailing edge 125. In one embodiment, resonator 550 is adapted to influence the turbulent flow and the von Karman vortices at the blunt trailing edge 125. Thus, the trailing edge noise of the blunt trailing edge may be considerably reduced. According to a further embodiment (not shown) a similar structure including one or more Helmholtz resonators may be located at or near the leading edge 110 of the blade to reduce the inflow noise and/or reduce the laminar layer oscillations. Typically, such a reactive system is installed within 50% chord length from the leading edge 110 and may be installed on both the suction and pressure sides 130, 140 or only on one of them.

FIG. 16 shows a cross-sectional view of a wind turbine rotor blade according to a further embodiment of the present invention. Therein, it is shown that rotor blade 100 includes an acoustically effective region 115 at its leading edge 110. FIG. 17 shows an enlarged cross-sectional view of the leading edge portion of this wind turbine rotor blade. The configuration of the acoustically effective leading edge region 115 is similar to the configuration of the acoustically effective region 135 shown in FIG. 4. In particular, the leading edge 110 of the rotor blade includes an acoustically porous surface layer 200. The properties and configuration of acoustically porous surface layer 200 are as described above with reference to FIG. 3. Furthermore, an air layer 400 is provided below acoustically porous surface layer 200. Beneath air layer 400, several reactive acoustic elements 500A-500F are provided. In the present embodiment, the reactive acoustic elements are realized as Helmholtz resonators but may also be of another resonator type as described above. Although being similar to the embodiments described above, it is mentioned that Helmholtz resonator 500D at the leading edge includes multiple apertures, namely a first duct 511D and a second duct 512D. However, this is an example of a multi-aperture Helmholtz resonator but should not be understood as a mandatory feature.

During operation of the wind turbine, Helmholtz resonators 500A-500F are activated by the incoming noise transmitted through acoustically porous surface layer 200. The Helmholtz resonators serve as reactive acoustic members for dissipating acoustic energy. Optionally, this effect can be further enhanced by providing the Helmholtz resonator with an absorptive lining on the inner walls of the resonating volume.

The various embodiments of the present invention each provide noise reduction during wind turbine operation. In particular, the embodiments realize broadband noise reduction by means of dissipative and reactive elements either alone or in combination with one another. Thus, the present invention provides a passive fail safe noise reduction system which can also be retrofitted to existing turbines.

This written description uses examples to disclose the invention, including the best mode, and also to enable any person skilled in the art to make and use the invention. While the invention has been described in terms of various specific embodiments, those skilled in the art will recognize that the invention can be practiced with modification within the spirit and scope of the claims. Especially, mutually non-exclusive features of the embodiments described above may be combined with each other. The patentable scope of the invention is defined by the claims, and may include other examples that occur to those skilled in the art. Such other examples are intended to be within the scope of the claims of they have structural elements that do not differ from the literal language of the claims, or if they include equivalent structural elements with insubstantial differences from the literal languages of the claims.

What is claimed is:

1. A rotor blade for a wind turbine, comprising:
   an acoustically porous surface layer at least partially covering at least one surface of the rotor blade;
   a plurality of reactive acoustic elements located below the acoustically porous surface layer; and
   a continuous air layer located between the acoustically porous surface layer and the plurality of reactive acoustic elements for covering, the plurality of reactive acoustic elements.

2. The rotor blade according to claim 1, wherein the plurality of acoustic elements comprises at least one of a capillary resonator, a resonating foil, a resonating plate, a perforated plate and a Helmholtz resonator.

3. The rotor blade according to claim 1, wherein the acoustically porous surface layer and the plurality of reactive acoustic elements are located at or near a leading edge of the rotor blade.

4. The rotor blade according to claim 1, wherein the rotor blade has a blunt trailing edge and the acoustically porous surface layer and the plurality of reactive acoustic elements are located at the blunt trailing edge of the rotor blade.

* * * * *

UNITED STATES PATENT AND TRADEMARK OFFICE
CERTIFICATE OF CORRECTION

| | | |
|---|---|---|
| PATENT NO. | : 7,959,412 B2 | Page 1 of 1 |
| APPLICATION NO. | : 11/536963 | |
| DATED | : June 14, 2011 | |
| INVENTOR(S) | : Bonnet | |

It is certified that error appears in the above-identified patent and that said Letters Patent is hereby corrected as shown below:

In Column 10, Line 25, in Claim 1, delete "covering," and insert -- covering --, therefor.

In Column 10, Line 28, in Claim 2, delete "of acoustic" and insert -- of reactive acoustic --, therefor.

Signed and Sealed this
Eighteenth Day of October, 2011

David J. Kappos
*Director of the United States Patent and Trademark Office*